C. L. PECK.
SEDIMENTATION APPARATUS.
APPLICATION FILED OCT. 5, 1918.
1,337,095.
Patented Apr. 13, 1920.
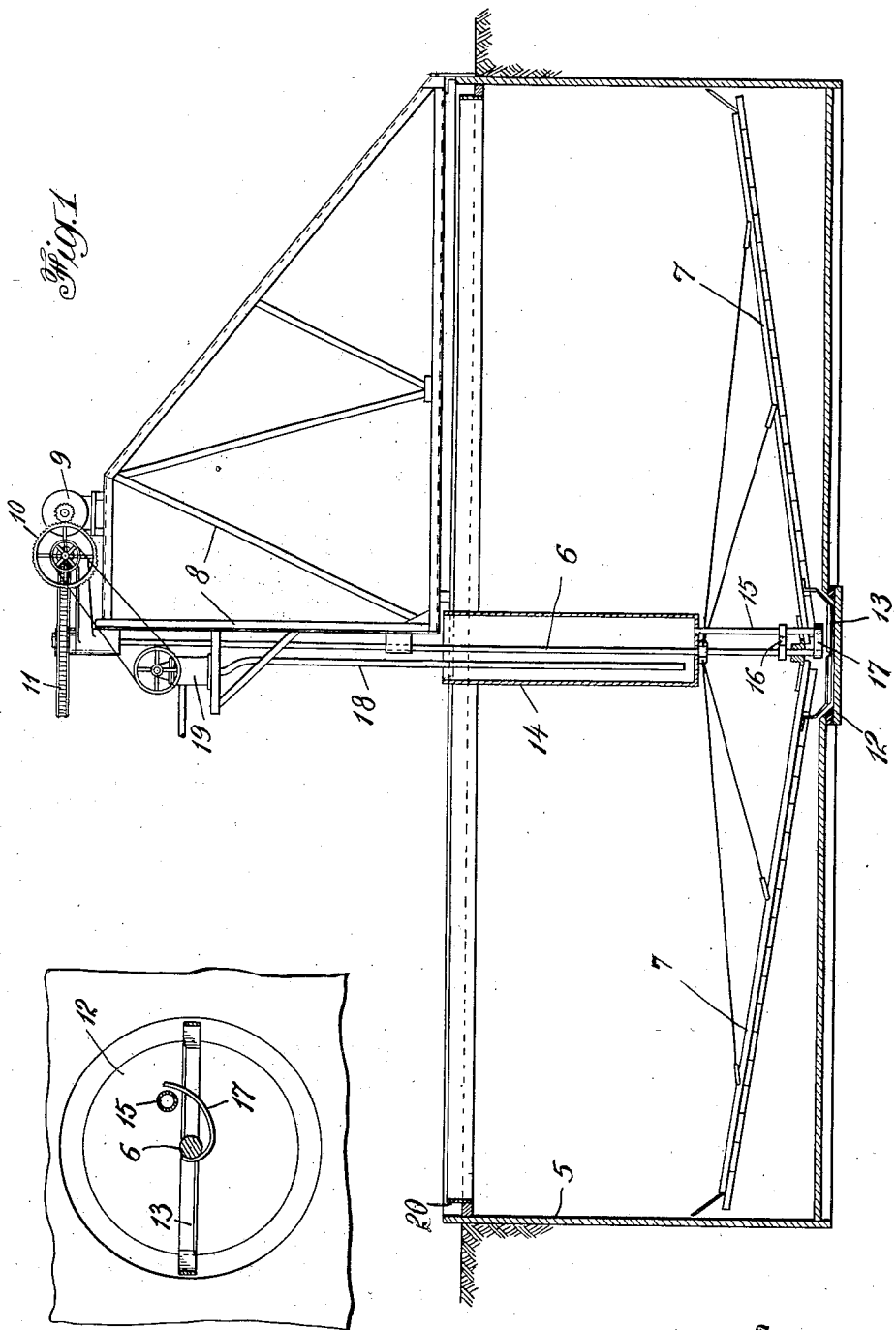
Inventor
Charles Lee Peck
By his Attorneys
Pennie, Davis, Marvin & Edmonds

UNITED STATES PATENT OFFICE.

CHARLES LEE PECK, OF NEW YORK, N. Y., ASSIGNOR TO THE DORR COMPANY, A CORPORATION OF DELAWARE.

SEDIMENTATION APPARATUS.

1,337,095.  Specification of Letters Patent.  Patented Apr. 13, 1920.

Application filed October 5, 1918. Serial No. 256,970.

*To all whom it may concern:*

Be it known that I, CHARLES LEE PECK, a citizen of the United States, residing at New York city, in the county of New York, State of New York, have invented certain new and useful Improvements in Sedimentation Apparatus; and I do hereby declare the following to be a full, clear, and exact description of the invention, such as will enable others skilled in the art to which it appertains to make and use the same.

This invention relates to sedimentation apparatus and has for its object the provision of certain improvements in the structure of such apparatus for conveniently withdrawing the sediment or sludge collecting therein.

In my copending application, Ser. No. 256,969, filed November 9, 1918, I have described an improved sedimentation apparatus in which the sludge is forced into a sludge well, arranged within the sedimentation tank or basin, by a difference in hydrostatic head of the material outside the well and the sludge in the well. The necessary difference in hydrostatic head for inducing the desired flow of sludge from the tank into the well is maintained by withdrawing sludge from the well. Sedimentation apparatus of this general type is usually provided with a revolving sludge collecting mechanism, and the improvements of my copending application are particularly adapted to be embodied in an apparatus in which this mechanism is operatively suspended in the tank, in which case the sludge well is secured to the mechanism surrounding the axis of rotation thereof, and all operative elements of the apparatus are positioned above the bottom of the tank. Apparatus embodying these improvements are of particular advantage in the treatment of trade effluents and sewage, where it is often necessary or desirable to place the sedimentation tank or basin in an excavation or pit in the ground.

The present invention contemplates the provision of an improved sedimentation apparatus embodying the principles of the improvements described in my copending application. Specifically, the sedimentation apparatus of the present invention involves the provision of a sludge well which is closed at its bottom, and is in communication with the sludge collecting in the tank through a conduit or pipe depending from the well into proximity with the bottom of the tank. The depending conduit is eccentrically arranged with respect to the axis of rotation of the revolving sludge collecting mechanism, and thus moves in a circular orbit about such axis. A deflector is preferably arranged in front of the lower end of the conduit for moving bulky solids, such as bottles, tin cans, pieces of clothing, and the like, outwardly beyond the path of the conduit. These and other novel features of the present invention will be better understood from the following description taken in conjunction with the accompanying drawings, in which:

Figure 1 is a sectional elevation of a sedimentation apparatus embodying the invention, and Fig. 2 is a fragmentary view in section of the central bottom portion of the sedimentation basin or tank of the apparatus.

As illustrated in the accompanying drawings, my improved sedimentation apparatus comprises a sedimentation tank or basin 5. As shown in the drawings, the sedimentation tank is set in an excavation or pit in the ground, the ground level being only slightly lower than the top of the tank. When treating sewage and trade waters, it is generally desirable or necessary to thus arrange the sedimentation tank underneath the ground and water level, and in such cases the provision of piping or moving parts beneath the basin is impracticable.

A revolving sludge collecting mechanism is operatively arranged in the tank 5. This mechanism comprises a central vertical shaft 6 to the lower end of which are secured radial arms 7 equipped with plows 7' for bringing the sediment or sludge toward the center of the basin by the slow rotation of the mechanism. The shaft 6 is rotatably supported by a suitable frame-work 8 mounted above the top of the tank 5. The shaft 6 may be rotated in any suitable manner, and in the accompanying drawings I have shown an electric motor 9 mounted on the frame-work 8 and connected by gearing 10 to a worm wheel 11 secured to the shaft 6. The revolving sludge collecting mechanism is thus suspended in the tank 5, and being entirely supported above the top of the tank, all parts of the mechanism are readily accessible for inspection and repair.

The bottom of the tank 5 is preferably provided with a relatively shallow circular depression or pit 12. Aside from the depression 12, the bottom of the tank is substantially flat, and no operative elements of the apparatus are positioned therebeneath. A scraper 13 is suitably secured to the radial arms 7 and depends into the depression 12 and by its rotation with the revolving mechanism prevents material from packing in the depression.

A cylindrical receptacle or well 14 is secured to the shaft 6 with its axis substantially coinciding with the axis of the shaft. The top of the receptacle 14 is open and is positioned at a slightly higher level than the top of the tank 5. The bottom of the receptacle 14 is closed and is positioned at a level intermediate the top and bottom of the tank 5.

A conduit or pipe 15 communicates with the receptacle 14 through the bottom thereof and depends vertically from the receptacle into proximity with the bottom of the tank 5. The conduit 15 is eccentrically positioned with respect to the rotatable shaft 6, and thus moves in a circular path about the shaft. Near its lower end, the conduit 15 is suitably spaced from and secured to the shaft 6 by a plate 16. A deflector or plow 17 is secured at the bottom of the shaft 6 and is positioned slightly in advance of the conduit 15, with respect to the direction of rotation of the revolving mechanism. The deflector 17 is shaped so as to move bulky solids outward beyond the path of the conduit 15, where such solids become accessible from above and may be conveniently removed so as not to interfere with the normal functions of the conduit 15.

Any suitable means may be provided for upwardly withdrawing the sludge accumulating in the receptacle 14, such, for example, as a bucket elevator, a sludge pipe and suitable sludge elevating means, and the like. In the accompanying drawings I have shown a vertically disposed sludge pipe or conduit 18 positioned in the receptacle 14 and extending substantially to the bottom thereof. A diaphragm pump 19 is operatively connected to the pipe 18 for pumping the sludge from the receptacle 14. In the drawings, I have shown the pump 19 operatively connected to the electric motor 9, but it will, of course, be understood that the pump may be driven in any suitable manner.

In the operation of the apparatus, the clear liquid overflows into a peripheral launder 20 and may be withdrawn in any convenient manner. The sediment or sludge is worked toward the center of the sedimentation tank by the plows attached to the slowly rotating arms 7 of the sludge collecting mechanism. When the contents of the receptacle 14 are withdrawn, a difference in hydrostatic head is effected between the inside and the outside of the receptacle. This causes the sludge to flow upwardly through the conduit 15 and into the receptacle 14, and this flow continues until a balance in hydrostatic head is effected. By continuously withdrawing the sludge from the receptacle 14, a continuous upward flow of sludge from the bottom of the tank 5 is effected. Thus, the sediment or sludge collecting on the bottom of the tank 5 is forced by the hydrostatic head of the material in the tank 5 into the receptacle 14 from whence the sludge is upwardly withdrawn by the pump 19. Continuous operation is obtained by maintaining the level of the sludge in the receptacle 14 low enough to provide an upward flow of sludge through the conduit 15 as a result of the hydrostatic head of the material in the tank 5.

The sludge discharging device of my improved apparatus is thus attached to the revolving mechanism and rotates with it. The sludge conduit 15 revolves in an orbit of such diameter as may be desired. The eccentric arrangement of the conduit 15 is of particular advantage, since it enables the convenient removal of any obstruction finding its way into the conduit. Thus, if the conduit 15 becomes closed by the entrance therein of a piece of clothing, or the like, too large to pass through the conduit, such obstruction can be very conveniently removed by emptying the receptacle 14 and forcing the obstruction out of the conduit from above. The conduit being a substantially straight pipe, it can be very conveniently cleaned from above by forcing a rod or brush through the same.

From the foregoing description it will be evident that I have provided a sedimentation apparatus in which all operative parts are readily and conveniently accessible both for inspection and repair. No operative elements of the apparatus are positioned beneath the bottom of the tank 5, thus eliminating the necessity for stuffing boxes and parts moving one upon another underneath the surface of the solution or sludge, which objectionable arrangements are necessary in devices of the prior art if the sludge is to be upwardly removed at the center. By my improved construction, bulky solids are moved outwardly from the center of the sedimentation tank by the deflector 17 and may be conveniently grappled from above and removed from the tank without interfering with the normal operation. If, however, the sludge conduit 15 does become obstructed by bulky or foreign solids, it can be very readily and conveniently cleared of such obstruction from above as previously described.

I claim:

1. A sedimentation apparatus comprising a tank, a sludge well open at its top and closed at its bottom and disposed within said tank and adapted to be substantially surrounded by the liquid material contained in the tank, a conduit communicating with said well and depending therefrom into communication with the sludge collecting in said tank, and means for withdrawing sludge from said well so as to maintain a difference in hydrostatic head between the material outside said well and the sludge within the well and for thereby inducing a flow of sludge from the tank through said conduit into said well.

2. A sedimentation apparatus comprising a tank, a sludge well disposed within said tank and having a closed bottom, a conduit communicating with said well and depending therefrom into communication with the sludge collecting in said tank, the level of the sludge in said well being normally lower than the level of the material in said tank, and means for maintaining the level of the sludge in said well sufficiently low to induce a flow of sludge from the tank through said conduit into the well as a result of the difference in hydrostatic head of the material outside the well and the sludge in the well.

3. A sedimentation apparatus comprising a tank, a revolving sludge collecting mechanism operatively suspended within said tank for working the sludge toward the center thereof, a sludge well open at its top and closed at its bottom secured to said mechanism surrounding the axis of rotation thereof, a conduit communicating with said well and depending therefrom into communication with the sludge collected by said mechanism, and means for withdrawing sludge from said well so as to maintain a difference in hydrostatic head between the material outside said well and the sludge within the well and for thereby inducing a flow of sludge from the tank through said conduit into said well.

4. A sedimentation apparatus comprising a tank, a revolving sludge collecting mechanism operatively arranged in said tank, a sludge well disposed within said tank surrounding the axis of rotation of said mechanism and secured thereto and having a closed bottom, a conduit communicating with said well and depending therefrom into communication with the sludge collected by said mechanism, the level of the sludge in said well being normally lower than the level of the material in said tank, and means for maintaining the level of the sludge in said well sufficiently low to induce a flow of sludge from the tank through said conduit into the well as a result of the difference in hydrostatic head of the material outside the well and the sludge in the well.

5. A sedimentation apparatus comprising a tank, a revolving sludge collecting mechanism operatively arranged in said tank, a sludge well secured to said mechanism and depending into said tank, a conduit communicating with said well and depending therefrom into proximity with the bottom of said tank, and means for upwardly withdrawing sludge from said well.

6. A sedimentation apparatus comprising a tank, a revolving sludge collecting mechanism operatively arranged in said tank, a sludge well secured to said mechanism and surrounding the axis of rotation thereof and having its bottom at a lower level and its top at a higher level than the normal liquid level of said tank, a conduit communicating with said well and depending therefrom into proximity with the bottom of said tank, and means for upwardly withdrawing sludge from said well.

7. A sedimentation apparatus comprising a tank, a sludge well depending into said tank, a conduit communicating with said well and extending in proximity to the bottom of said tank, and means for upwardly withdrawing sludge from said well.

8. A sedimentation apparatus comprising a tank, a revolving sludge collecting mechanism operatively arranged in said tank, a sludge well secured to said mechanism and surrounding the axis of rotation thereof and having a closed bottom at a lower level and an open top at a higher level than the normal liquid level of said tank, a conduit communicating with said well and depending from the bottom thereof into proximity with the bottom of said tank and eccentrically positioned with respect to the axis of rotation of said mechanism, and means for upwardly withdrawing sludge from said well.

9. A sedimentation apparatus comprising a tank, a revolving sludge collecting mechanism operatively arranged in said tank, a sludge well secured to said mechanism and surrounding the axis of rotation thereof, said well having a closed bottom and an open top, a conduit communicating with said well and depending vertically from the bottom thereof into proximity with the bottom of the tank, said conduit being eccentrically positioned with respect to the axis of rotation of said mechanism, and means for upwardly withdrawing sludge from said well.

10. A sedimentation apparatus comprising a tank, a revolving sludge collecting mechanism operatively arranged in said tank, a cylindrical sludge well secured to said mechanism with its axis coinciding with the axis of rotation of said mechanism, said well having a closed bottom and an open top, a vertically disposed conduit communicating with said well and depending from the bottom thereof into proximity with the bottom of said tank and eccentrically positioned with respect to the axis of rotation of said mechanism, and means for upwardly withdrawing sludge from said well.

11. A sedimentation apparatus comprising a tank, a revolving sludge collecting mechanism operatively arranged in said tank, a sludge well secured to said mechanism and depending into said tank, a conduit communicating with said well and depending therefrom into proximity with the bottom of said tank, a deflector secured to said mechanism and arranged to move bulky solids outwardly beyond the path of said conduit, and means for upwardly withdrawing sludge from said well.

12. A sedimentation apparatus comprising a tank, a revolving sludge collecting mechanism operatively arranged in said tank, a sludge well secured to said mechanism and surrounding the axis of rotation thereof, said well having a closed bottom and an open top, a conduit communicating with said well and depending vertically from the bottom thereof into proximity with the bottom of said tank, said conduit being eccentrically positioned with respect to the axis of rotation of said mechanism, a deflector secured to said mechanism and arranged to move bulky solids outwardly beyond the path of said conduit, and means for upwardly withdrawing sludge from said well.

13. A sedimentation apparatus comprising a tank, a revolving sludge collecting mechanism operatively arranged in said tank, a cylindrical sludge well secured to said mechanism with its axis coinciding with the axis of rotation of said mechanism, said well having a closed bottom positioned at a level intermediate the top and bottom of said tank and having an open top positioned at a level above the top of said tank, a vertically disposed conduit communicating with said well and depending from the bottom thereof into proximity with the bottom of said tank and eccentrically positioned with respect to the axis of rotation of said mechanism, a deflector secured to said mechanism and arranged to move bulky solids outwardly beyond the path of said conduit, and means for upwardly withdrawing sludge from said well.

14. A sedimentation apparatus comprising a tank having at its bottom a centrally disposed circular depression, a revolving sludge collecting mechanism operatively arranged in said tank, a sludge well secured to said mechanism and surrounding the axis of rotation thereof, said well having a closed bottom and an open top, a conduit communicating with said well and depending vertically from the bottom thereof into proximity with the bottom of said tank, said conduit being eccentrically positioned with respect to the axis of rotation of said mechanism, a deflector secured to said mechanism and arranged to move bulky solids outwardly beyond the path of said conduit, a scraper secured to said mechanism and arranged to rotate in said depression to prevent the packing of solids therein, and means for upwardly withdrawing sludge from said well.

15. A sedimentation apparatus comprising a tank, a revolving sludge collecting mechanism operatively arranged in said tank and rotatably supported above the top of the tank, a sludge well secured to said mechanism and surrounding the axis of rotation thereof and having a closed bottom at a lower level and an open top at a higher level than the normal liquid level of said tank, a conduit communicating with said well and depending from the bottom thereof into proximity with the bottom of said tank and eccentrically positioned with respect to the axis of rotation of said mechanism, means for upwardly withdrawing sludge from said well, and motive means mounted above said tank and operatively connected to said mechanism and to said last mentioned means.

16. A sedimentation apparatus comprising a tank, a revolving sludge collecting mechanism operatively arranged in said tank, a sludge well secured to said mechanism and surrounding the axis of rotation thereof and having a closed bottom at a lower level and an open top at a higher level than the normal liquid level of said tank, a conduit communicating with said well and depending from the bottom thereof into proximity with the bottom of said tank and eccentrically positioned with respect to the axis of rotation of said mechanism, a pipe depending into said well, and a pump operatively connected to said pipe.

17. A sedimentation apparatus comprising a tank, a revolving sludge collecting mechanism operatively arranged in said tank and rotatably supported above the top of the tank, a cylindrical sludge well secured to said mechanism with its axis coinciding with the axis of rotation of said mechanism, said well having a closed bottom positioned at a level intermediate the top and bottom of said tank and having an open top positioned at a level above the top of said tank, a vertically disposed conduit communicating with said well and depending from the bottom therof into proximity with the bottom of said tank and eccentrically positioned with respect to the axis of rotation of said mechanism, a pipe depending into said well and extending into proximity with the bottom thereof, and a pump operatively connected to said pipe.

In testimony whereof I affix my signature.

CHARLES LEE PECK.